Feb. 5, 1952  A. H. BECKMAN  2,584,782
GUARD OR PROTECTOR FOR POULTRY SERVICE UTENSILS
Filed Sept. 4, 1946

Inventor:
August H. Beckman
by his Attorneys
Howson &
Howson

Patented Feb. 5, 1952

2,584,782

UNITED STATES PATENT OFFICE 2,584,782

GUARD OR PROTECTOR FOR POULTRY SERVICE UTENSILS

August H. Beckman, Sciota, Pa.

Application September 4, 1946, Serial No. 694,788

3 Claims. (Cl. 119—77)

This invention relates to new and useful improvements in poultry watering fountains, feeders and the like service utensils, of any preferred or conventional type; and relates more particularly to a novel form of guard or protector for preventing or discouraging the perching and roosting of fowl on the tops of the watering fountains, feeders, etc. on which the attachment is installed.

One of the common disadvantages attending the use of the conventional poultry watering fountains, etc. resides in the fact that the poultry will perch or roost on the tops of such fountains, etc. and deposit their droppings thereon, or into the underlying troughs from which the poultry normally drink or feed.

Furthermore, the fowl droppings are frequently washed, by rain, into the water or feed in the fountain or feeder troughs, which causes contamination of the water or feed and increases the danger of one sick fowl in a flock spreading disease among the rest of the flock when feeding or watering from the same service utensil.

With the aforesaid disadvantages in mind, one object of this invention is to provide an attachment for a poultry service utensil which will prevent poultry from perching or roosting on the top of such utensil, thereby eliminating contamination of the water or feed in said utensil, with a resultant decrease in the spread of disease among a flock of domestic poultry.

Another object of the present invention is to provide a novel guard or protector, as set forth, which is of relatively simple construction yet entirely effective and efficient in use and operation and readily adaptable for use with existing poultry service utensils at a relatively low cost.

A still further object of the present invention is to provide novel means for preventing poultry from roosting on the tops of watering fountains, etc. which is entirely safe and harmless to the poultry, and which operates without any deleterious effects on such poultry.

The above and other objects will more clearly appear from the following detailed description of the device, with particular reference to the accompanying drawing, in which.

Figure 1:
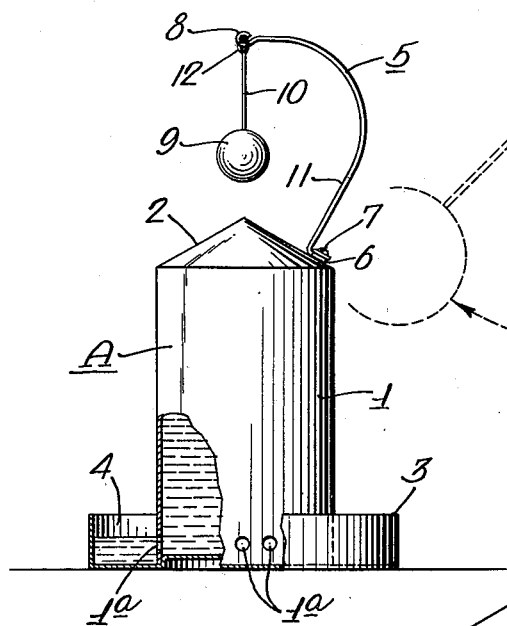
Fig. 1 is a side elevation, partially in section, showing the invention as applied to a poultry watering fountain.
Figure 2:
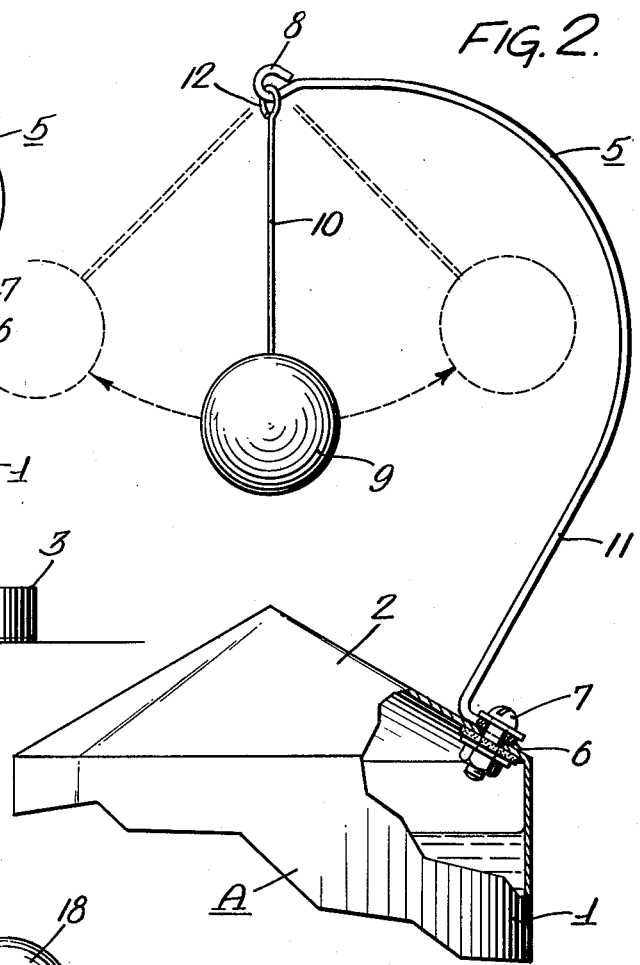
Fig. 2 is an enlarged fragmentary view partially in section, showing a detail of the invention.

Referring to the drawing in detail, Fig. 1 shows a conventional type of watering fountain A comprising a hollow cylindrical upright receptacle 1, a conical top or roof 2 attached to and sealing the upper end of the receptacle 1, and a dished base 3, having a greater diameter than that of the cylindrical receptacle 1, thus providing a space or trough 4 around said upright receptacle 1 when said receptacle and base are assembled in the manner clearly shown in Fig. 1.

Water may be poured into the cylindrical receptacle 1 through the open, normally-bottom or lower end thereof, said receptacle being detached from the base 3 and being inverted during the pouring or filling of the receptacle. When the receptacle 1 is filled with water, the base member 3 is placed thereover and the assemblage is inverted and placed in an operating position with the water fountain A in an upright position, and with the water flowing from the receptacle 1 through openings 1a in the side wall thereof into the trough 4 until the level of the water in the trough 4 rises to the plane of the upper edges of the openings 1a.

The guard or protector forming the subject matter of the present invention is applied to the watering fountain A as follows:

A suitable resilient bracket 5 is formed preferably of $\frac{3}{16}$ inch spring wire, with one end bent, for example, into the form of an eye 6 adapted to be attached to the top side of the lid or cover member 2, as by a rivet or screw 7. The opposite or terminal end of the bracket 5 is formed into a loop or an open hook 8.

The bracket 5 extends upwardly from a point near the edge of the top 2 of the receptacle 1, and is curved inwardly to position the loop or hook 8 directly above the center of said top member 2, with a free, open space above the upper surface of the cover 2 of the watering fountain.

A preferably weighted impact member, composed of any suitable material, is attached to one end of a suspending wire, cable, or chain member 10. The opposite end of the suspending member 10 is attached to the hook or loop 8 of said bracket 5 by means of an eye 12 formed at the said opposite end of said wire, cable or chain member 10. The eye 12 is adapted to hook over the loop or hook member 8. By this construction, the impact member 9 is suspended to swing or oscillate freely in any direction on an arc swung from the hook 8, immediately above the cover 2 of the receptacle 1, since the wire, cable or chain member 10 is shorter than the distance between the hook or loop member 8 and the uppermost point of the cover 2.

The above described structure is adaptable, not only to a conical shaped cover 2, as shown in Fig. 1, but is likewise adaptable for use with a flat-topped receptacle, by bending the eye end 6 of the bracket member 5 at an oblique angle to the intermediate portion 11 of said bracket, to thus permit attachment of said end to the flat surface of the top and at the same time positioning the terminal or loop end 8 of the bracket member 5 directly above the center of the flat top of said receptacle.

In operation, due to the resilient nature and small cross-section of the bracket member 5, poultry cannot possibly perch or roost on said bracket member and offset the effectiveness of the guard or protector of my present invention. Further, since the impact member 9 is suspended from said bracket, so as to permit free oscillation or swinging of the member 9, the arrangement is such that when a rooster or hen attempts to roost or perch upon the top 2 of the watering fountain A, such chicken will necessarily strike the impact member 9 and cause it to oscillate or move outwardly from the chicken and then return to its normal position. In returning to its normal position, the impact element 9 will strike the chicken with enough force to dislodge it from the top 2 of the watering fountain A, without causing injury to the chicken. By such means, the top 2 of the watering fountain is kept clear of all poultry and as a consequence, no droppings are permitted to fall either on the top 2 of said watering fountain A or into the open trough 4 surrounding the fountain, thereby preventing the water or feed in the trough 4 from becoming contaminated and causing the spread of disease throughout the flock using the utensil.

Figure 3:
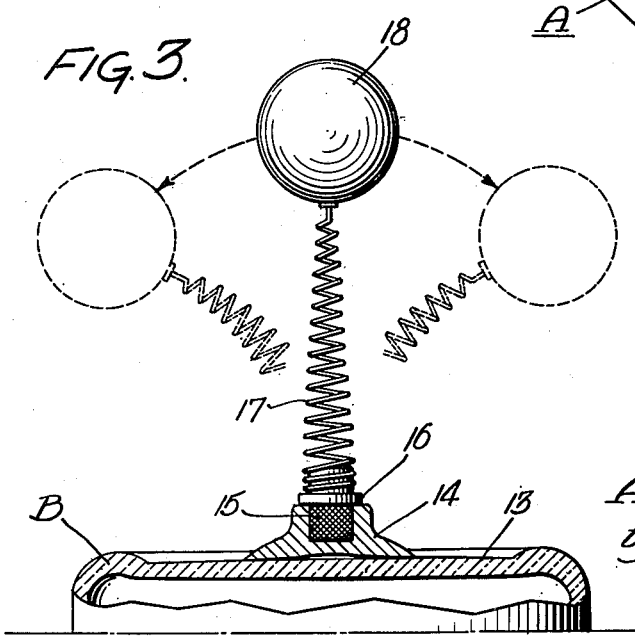
Fig. 3 is a fragmentary view illustrating a modification within the scope of the present invention.

As a modification of the present invention, Fig. 3 illustrates another structure for preventing perching or roosting of fowl on the top of a watering fountain, etc., which modification comes within the scope of the present invention. In said figure, B represents a watering or feeding receptacle having a flat top 13. Attached to said flat top 13 of the receptacle B, is a resilient suction type base 14. The base 14 is provided with a central hole 15 which is adapted to receive a screw-threaded or other plug 16, or its equivalent, carried by one end of an elongated spring member 17. The spring member 17 is adapted to extend perpendicularly to the flat top 13 of the utensil B, and to carry at its upper extremity an impact member 18. The spring element 17 may consist of a single thin flexible wire, similar to the bracket 5, or a tapering coiled spring, as shown in Fig. 3.

In operation, as shown in dotted lines in Fig. 3, when a chicken or other fowl attempts to perch or roost on the top 13 of the utensil B, the chicken will collide with and knock the resiliently mounted member 18 sidewise, whereupon the spring 17 will react to return the impact element 18 to its normal upright position. As the impact member 18 returns to its static normally perpendicular position, it will strike the chicken and force it to leave its position on the top 13 of the utensil B.

It is to be understood, of course, that the bracket member 5 or suction base 14 may be attached to a metallic or non-metallic utensil, such as a glass receptacle, Fig. 3; and that any suitable means may be employed to secure the support for the impact element to such receptacle without departing from the spirit of the invention.

I claim:

1. An anti-roosting device for use on chick fountains or the like comprising a resilient arcuate wire member secured at one end thereof, the other end thereof hanging in vertical spaced relation above the central portion of the top of said fountain, an impact element pendant from said arcuate wire member and adapted to oscillate within a 360 degrees circumference above said fountain to prevent roosting on said fountain.

2. An anti-roosting device for use on chick fountains or the like comprising a resilient arcuate wire member secured at one end thereof, the other end thereof hanging in vertical spaced relation above the central portion of the top of said fountain, being insufficient to support a fowl attempting to roost thereon, an impact element pendant from said arcuate wire member and adapted to oscillate within a 360 degrees circumference above said fountain to prevent roosting on said fountain.

3. A device for preventing the roosting of fowl on the top of a chick fountain or the like comprising a resilient arcuate member rigidly secured at one end thereof to the fountain, the other end adapted to overhang the top of said fountain and formed in the shape of a hook, a weighted impact element pendant from said hook by means of a rigid rod, said impact element being adapted to oscillate freely above the top surface of the fountain when contact is made therewith.

AUGUST H. BECKMAN.

REFERENCES CITED

The following references are of record in the file of this patent:

UNITED STATES PATENTS

| Number | Name | Date |
| --- | --- | --- |
| 104,667 | Upson | June 21, 1870 |
| 148,881 | Griffin | Mar. 24, 1873 |
| 372,849 | Harrington | Nov. 8, 1887 |
| 390,808 | Sergeant | Oct. 9, 1888 |
| 712,923 | Frysinger | Nov. 4, 1902 |
| 1,917,371 | Hill | July 1, 1933 |
| 1,933,926 | Olson | Nov. 7, 1933 |